(12) United States Patent
Takahashi (10) Patent No.: US 12,346,621 B2
(45) Date of Patent: Jul. 1, 2025

(54) PROCESSOR USING CORRECTION REGION

(71) Applicant: FUJIFILM Corporation, Tokyo (JP)

(72) Inventor: Kosuke Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/463,635

(22) Filed: Sep. 8, 2023

(65) Prior Publication Data

US 2024/0086133 A1 Mar. 14, 2024

(30) Foreign Application Priority Data

Sep. 12, 2022 (JP) ................. 2022-144849

(51) Int. Cl.
*G06F 3/14* (2006.01)
*G02B 27/01* (2006.01)
*G09G 5/377* (2006.01)

(52) U.S. Cl.
CPC .......... *G06F 3/14* (2013.01); *G02B 27/0172* (2013.01); *G09G 5/377* (2013.01); *G09G 2340/0464* (2013.01)

(58) Field of Classification Search
CPC .... G02B 2027/0178; G02B 2027/0187; G02B 27/0093; G02B 27/0172; G06F 3/048; G06F 3/14; G06F 3/147; G09G 2320/0261; G09G 2340/0464; G09G 2340/145; G09G 2354/00; G09G 5/377; G09G 5/38; G09G 5/00; G06T 5/50
See application file for complete search history.

(56) References Cited

U.S. PATENT DOCUMENTS

| | | | |
|---|---|---|---|
| 10,695,612 B2 | 6/2020 | Tsukahara et al. | |
| 2009/0201246 A1 | 8/2009 | Lee et al. | |
| 2014/0111550 A1* | 4/2014 | Abraham | G09G 5/00 345/660 |
| 2015/0170602 A1 | 6/2015 | Kang | |
| 2016/0189351 A1 | 6/2016 | Holz et al. | |
| 2017/0064157 A1 | 3/2017 | Lawrence | |
| 2018/0218714 A1 | 8/2018 | Yamaguchi et al. | |
| 2021/0241425 A1* | 8/2021 | Uchidate | G06T 5/50 |

FOREIGN PATENT DOCUMENTS

| | | |
|---|---|---|
| JP | 2014-110474 A | 6/2014 |
| WO | WO 2017/109567 A1 | 6/2017 |

OTHER PUBLICATIONS

Extended European Search Report for European Application No. 23196665.6, dated Apr. 10, 2024.
Partial European Search Report for European Application No. 23196665.6, dated Jan. 29, 2024.

* cited by examiner

*Primary Examiner* — Richard J Hong
(74) *Attorney, Agent, or Firm* — Birch, Stewart, Kolasch & Birch, LLP (57) ABSTRACT

A processor is configured to, based on a change of a relative position between a transmissive display device and a user's eye, derive a second position according to a first position of a display image displayed in a display region of the display device and the change of the relative position, change the first position to the second position in a case in which the second position does not exceed a correction region where a correction of a display position is possible, and change the first position to a third position and display the display image within the correction region in a case in which the second position exceeds the correction region.

9 Claims, 8 Drawing Sheets

PROCESSOR USING CORRECTION REGION

CROSS REFERENCE TO RELATED APPLICATIONS

This application claims priority from Japanese Application No. 2022-144849, filed on Sep. 12, 2022, the entire disclosure of which is incorporated herein by reference.

BACKGROUND

1. Technical Field

The present disclosure relates to a processor, an image processing device, a glasses-type information display device, an image processing method, and a non-transitory storage medium storing an image processing program.

2. Related Art

A transmissive display device such as an augmented reality (AR) device that displays a state in which images are superimposed in a real space is known in the related art as a display device that displays a three-dimensional video.

In a case in which a relative position between the transmissive display device and the user's eye changes, such as in a case in which the user is running, the display image displayed on the display device may be blurred and visually recognized. For this reason, in order to suppress blurred visual recognition, a technique for performing so-called image stabilization, in which a display position of a display image is changed so as to cancel a change of a relative position between the transmissive display device and the user's eye is known (for example, refer to JP2014-110474A).

SUMMARY

However, in the technique of the related art, in a case in which the position of the display image is changed for image stabilization, the display image may not be displayed appropriately, for example, the display image may not be displayed.

The present disclosure has been made in view of the above circumstances, and an object of the present disclosure is to provide a processor, an image processing device, a glasses-type information display device, an image processing method, and a non-transitory storage medium storing an image processing program capable of performing image stabilization for an appropriate display position of a display image.

In order to achieve the above object, a processor of a first aspect of the present disclosure is configured to, based on a change of a relative position between a transmissive display device and a user's eye, derive a second position according to a first position of a display image displayed in a display region of the display device and the change of the relative position, change the first position to the second position in a case in which the second position does not exceed a correction region where a correction of a display position is possible, and change the first position to a third position and display the display image within the correction region in a case in which the second position exceeds the correction region.

According to a processor of a second aspect of the present disclosure, in the processor of the first aspect, the processor is configured to change a position of the display region with respect to the correction region according to the change of the relative position.

According to a processor of a third aspect of the present disclosure, in the processor of the second aspect, the processor is configured to independently correct display positions of the plurality of display images, in a case in which a plurality of the display images are displayed in the display region.

According to a processor of a fourth aspect of the present disclosure, in the processor of the third aspect, the processor is configured to perform a control to change a display position of the second display image according to the first display image after changing the display position to the third position, in a case in which a first display image is superimposed on a second display image by changing a display position of the first display image to the third position.

According to a processor of a fifth aspect of the present disclosure, in the processor of the third aspect, the processor is configured to selectively perform any of a first control to change a display position of the second display image according to the first display image after changing the display position to the third position, a second control to superimpose and display the first display image and the second display image, or a third control to set the display position of the first display image to the second position, in a case in which a first display image is superimposed on a second display image by changing a display position of the first display image to the third position.

According to a processor of a sixth aspect of the present disclosure, in the processor of the third aspect, a displayable range in which the display of the display image is possible is predetermined according to a degree of the change of the relative position, and the processor is configured to change the display position of the display image to within the displayable range.

According to a processor of a seventh aspect of the present disclosure, in the processor of the sixth aspect, the processor is configured to select the displayable range according to a motion state of the user, and changes the display position of the display image to within the selected displayable range.

According to a processor of an eighth aspect of the present disclosure, in the processor of the third aspect, the processor is configured to perform a control to hide the display image instead of changing the first position to the third position, in a case in which a change amount of the relative position exceeds a predetermined threshold value.

According to a processor of a ninth aspect of the present disclosure, in the processor of the first aspect, the display image is divided into a plurality of partial regions, and the third position is a position where at least a predetermined partial region among the plurality of partial regions is within the correction region.

According to a processor of a tenth aspect of the present disclosure, in the processor of the first aspect, a priority according to an area within the correction region is given to the display image, and the processor is configured to change the second position to the third position based on the priority, in a case in which the second position exceeds the correction region.

According to a processor of an eleventh aspect of the present disclosure, in the processor of the first aspect, a case in which the second position exceeds the correction region where the correction of the display position is possible is a case in which at least a part of the display image is outside the correction region.

According to a processor of a twelfth aspect of the present disclosure, in the processor of the first aspect, a case in which the second position exceeds the correction region where the correction of the display position is possible is a case in which 90% or more of an area of the display image is outside the correction region.

In order to achieve the above object, an image processing device of a thirteenth aspect of the present disclosure comprises a processor configured to, based on a change of a relative position between a transmissive display device and a user's eye, derive a second position according to a first position of a display image displayed in a display region of the display device and the change of the relative position, change the first position to the second position in a case in which the second position does not exceed a correction region where a correction of a display position is possible, and change the first position to a third position and display the display image within the correction region in a case in which the second position exceeds the correction region.

In order to achieve the above object, a glasses-type information display device of a fourteenth aspect of the present disclosure comprises a transmissive display device and the processor of the present disclosure.

In order to achieve the above object, an image processing method executed by a processor of a fifteenth aspect of the present disclosure comprises, based on a change of a relative position between a transmissive display device and a user's eye, deriving a second position according to a first position of a display image displayed in a display region of the display device and the change of the relative position, changing the first position to the second position in a case in which the second position does not exceed a correction region where a correction of a display position is possible, and changing the first position to a third position and displaying the display image within the correction region in a case in which the second position exceeds the correction region.

In order to achieve the above object, a non-transitory storage medium storing an image processing program for causing a processor to execute a process of a sixteenth aspect of the present disclosure comprises, based on a change of a relative position between a transmissive display device and a user's eye, deriving a second position according to a first position of a display image displayed in a display region of the display device and the change of the relative position, changing the first position to the second position in a case in which the second position does not exceed a correction region where a correction of a display position is possible, and changing the first position to a third position and displaying the display image within the correction region in a case in which the second position exceeds the correction region.

According to the present disclosure, it is possible to perform image stabilization for an appropriate display position of a display image.

DESCRIPTION OF EMBODIMENTS

Hereinafter, examples of an embodiment for implementing the technique of the present disclosure will be described in detail with reference to the drawings.

First Embodiment

Figure 1:
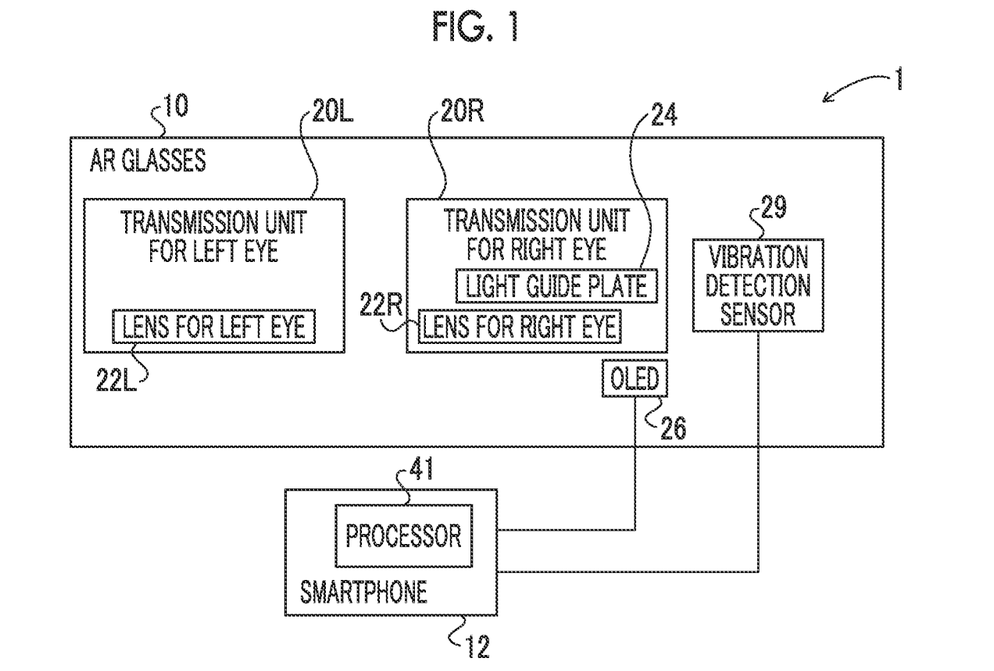
FIG. 1 is a configuration diagram showing an example of a configuration of a glasses-type information display device according to an embodiment.

The configuration of a glasses-type information display device 1 according to the present embodiment will be described with reference to FIG. 1. As shown in FIG. 1, the glasses-type information display device 1 according to the present embodiment comprises augmented reality (AR) glasses 10 and a smartphone 12.

Figure 2:
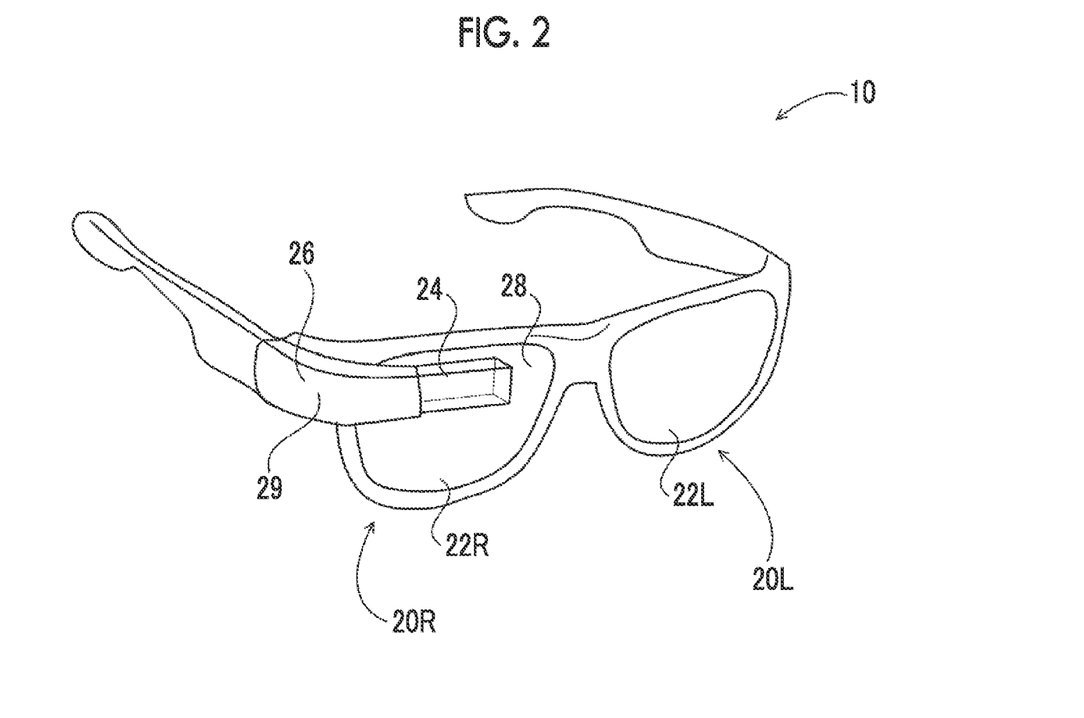
FIG. 2 is a perspective view showing an example of AR glasses according to the embodiment.

The AR glasses 10 are a device that allows a user to visually recognize a projection image, which is projected from an organic light emitting diode (OLED) 26, in a state in which the projection image is superimposed on a real image. FIG. 2 is a perspective view of an example of the AR glasses 10 of the present embodiment. As shown in FIGS. 1 and 2, the AR glasses 10 comprise a pair of a transmission unit 20L for a left eye and a transmission unit 20R for a right eye, an OLED 26, and vibration detection sensor 29. The AR glasses 10 of the present embodiment are an example of a transmissive display device of the present disclosure.

The OLED 26 projects an image (projection image), which represents information, onto the transmission unit 20R for a right eye in order to insert information into the visual field of a real image, which is visually recognized by the user through the transmission unit 20R for a right eye, in a superimposed manner.

The transmission unit 20R for a right eye includes a lens 22R for a right eye and a light guide plate 24. Light corresponding to the projection image projected from the OLED 26 is incident on one end of the light guide plate 24. The direction of light propagated through the light guide plate 24 is changed at an emission portion (not shown), and the light is emitted in a direction of the user's eye. The light, which is emitted from the light guide plate 24 and corresponds to the projection image, is transmitted through the lens 22R for a right eye, is guided to the right eye of the user, and is visually recognized as a projected image with the right eye. In addition, the user visually recognizes a real space, which is shown through the lens 22R for a right eye, as a real image with the right eye.

For this reason, while the projection image is projected from the OLED 26, the visually-recognized image visually recognized with the right eye of the user is in a state in which the projected image according to the projection image projected onto the light guide plate 24 is superimposed on the real image representing the real space shown through the lens 22R for a right eye. In addition, while the projection image is not projected from the OLED 26, the visually-recognized image visually recognized by the user is the real image that represents the real space shown through the lens 22R for a right eye and the light guide plate 24.

Meanwhile, the transmission unit 20L for a left eye includes a lens 22L for a left eye. The user visually recognizes the real space, which is shown through the lens 22L for a left eye, with the left eye.

The vibration detection sensor 29 is a sensor that detects a change of a relative position between the AR glasses 10 and the user's eye as vibration of the AR glasses 10. That is, the vibration detection sensor 29 is a sensor that detects so-called "blur". Specifically, in the vibration detection sensor 29 is a sensor that detects a moving direction indicating whether the AR glasses 10 have moved in an in-plane direction of the lens 22R for a right eye, in other words, in a left-right or up-down direction of the user, and the moving amount in the moving direction. The moving direction and the moving amount detected by the vibration detection sensor 29 are output to the smartphone 12 as information indicating vibration.

On the other hand, the smartphone 12 comprises a processor 41. The processor 41 of the present embodiment controls the OLED 26 to project the projection image onto the light guide plate 24 from the OLED 26. In addition, the processor 41 of the present embodiment performs a control of correcting blurring, that is, a change of a relative position between the AR glasses 10 and the user's eye. The smartphone 12 of the present embodiment is an example of an image processing device of the present disclosure.

Figure 3:
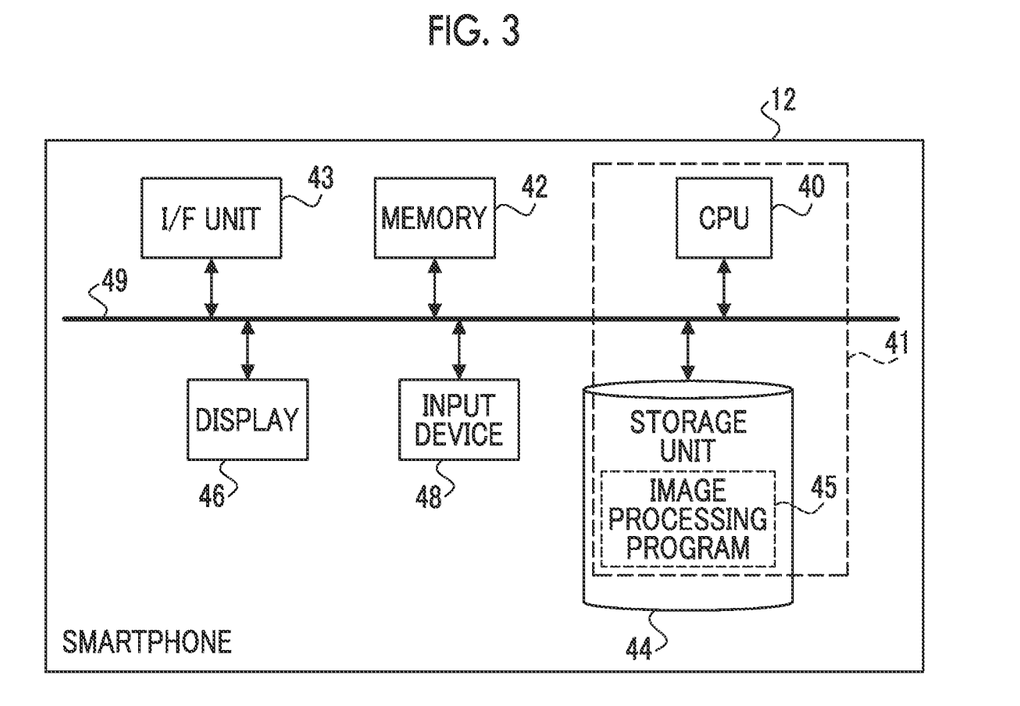
FIG. 3 is a block diagram showing an example of a hardware configuration of the smartphone according to the embodiment.

FIG. 3 shows a block diagram showing an example of a hardware configuration of the smartphone 12. As shown in FIG. 3, the smartphone 12 comprises a central processing unit (CPU) 40, a memory 42, an interface (I/F) unit 43, a storage unit 44, a display 46, and an input device 48. The CPU 40, the memory 42, the I/F unit 43, the storage unit 44, the display 46, and the input device 48 are connected to each other via a bus 49, such as a system bus or a control bus, such that various types of information can be given and received therebetween.

The CPU 40 reads out various programs, which include an image processing program 45 stored in the storage unit 44, to the memory 42 and performs processing corresponding to the program read out. Accordingly, the CPU 40 performs a control of the image stabilization and a control of the display of the projected image by the OLED 26. As an example, the processor 41 of the present embodiment is composed of a combination of the CPU 40 and the image processing program 45. The memory 42 is a work memory that is used in a case in which the CPU 40 performs processing.

The image processing program 45 executed in the CPU 40 is stored in the storage unit 44. In addition, the image data (not shown) of the projection image projected from the OLED 26, various other types of information, and the like are also stored in the storage unit 44. Specific examples of the storage unit 44 include a hard disk drive (HDD), a solid state drive (SSD), and the like.

The I/F unit 43 communicates various types of information to each of the OLED 26 using wireless communication or wired communication. The display 46 and the input device 48 function as a user interface. The display 46 provides various types of information, which is related to the projection of the projection image, to a user. The display 46 is not particularly limited, and examples of the display 46 include a liquid crystal monitor, a light emitting diode (LED) monitor, and the like. In addition, the input device 48 is operated by a user so that various instructions related to the projection of the projection image are input. The input device 48 is not particularly limited, and examples of the input device 48 include a keyboard, a touch pen, a mouse, and the like. A touch panel display in which the display 46 and the input device 48 are integrated with each other is employed in the smartphone 12.

Figure 4:
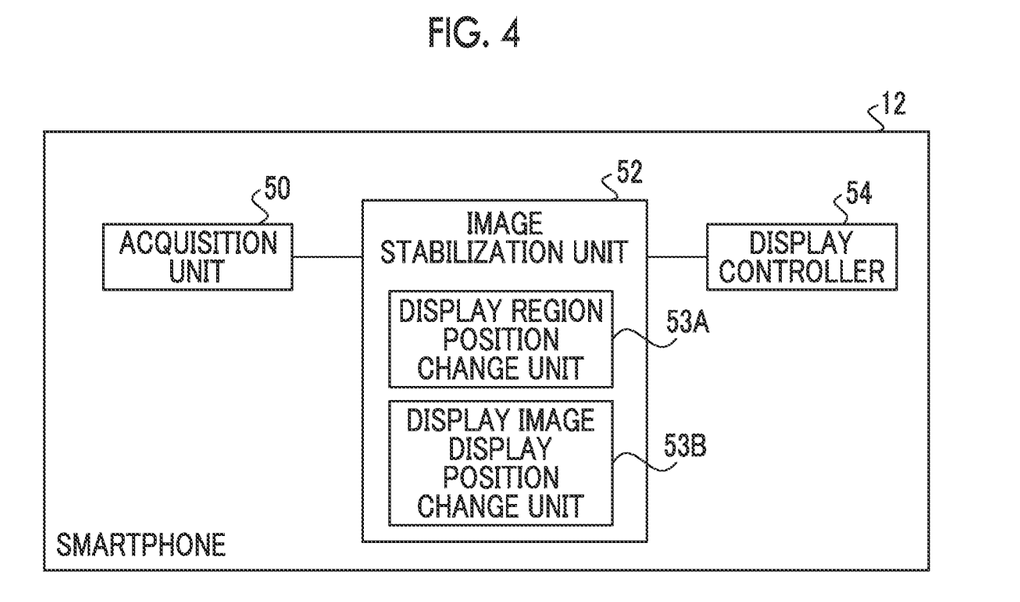
FIG. 4 is a block diagram showing an example of a configuration of the processor according to the embodiment.

FIG. 4 shows a functional block diagram showing an example of a configuration related to the function of the processor 41 of the present embodiment. As shown in FIG. 4, the processor 41 comprises an acquisition unit 50, an image stabilization unit 52, and a display controller 54. As an example, in the smartphone 12 of the present embodiment, the CPU 40 executes the image processing program 45 stored in the storage unit 44, so that the CPU 40 functions as the acquisition unit 50, the image stabilization unit 52, and the display controller 54.

The acquisition unit 50 acquires information indicating the vibration from the vibration detection sensor 29 of the AR glasses 10. The acquisition unit 50 outputs the acquired information indicating the vibration to the image stabilization unit 52.

The image stabilization unit 52 of the present embodiment has a function of correcting the display position of the display image to cancel the blur based on the information indicating the vibration. As shown in FIG. 4, the image stabilization unit 52 includes a display region position change unit 53A and a display image display position change unit 53B. The image stabilization and a change of the display position of the display image by the image stabilization unit 52 will be described with reference to FIG. 5A and FIG. 5B.

Figure 5A:
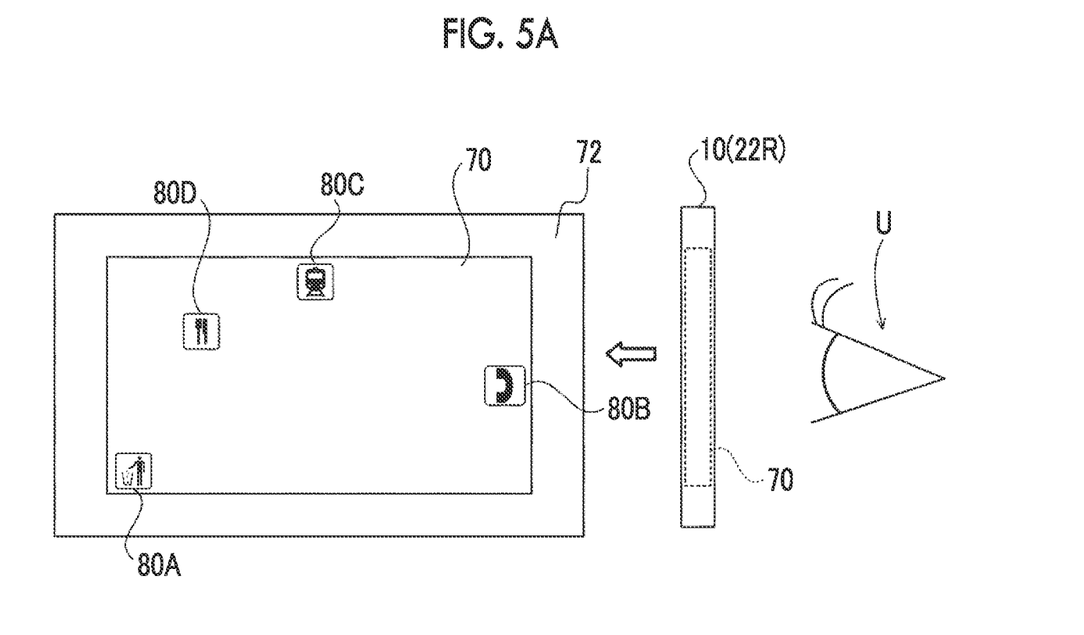
FIG. 5A is a diagram for explaining image stabilization by the processor according to the embodiment.

As shown in FIG. 5A, a state in which the user's eye U and the AR glasses 10 are facing each other is defined as an initial state in which no blurring occurs. In the AR glasses 10, a display region 70 that displays a display image 80 displayed by projecting a projection image from the OLED 26 is provided. FIG. 5A shows display images 80A to 80D as an example of the display image 80. In the present embodiment, in a case in which the display images 80A to 80D are collectively referred to without distinguishing between them, they are referred to as the display image 80.

In addition, in the AR glasses 10, a correction region 72 for correcting the display position of the display image 80 in a case in which blurring occurs is provided. A position of the correction region 72 is fixed with respect to the lens 22R for a right eye. As an example, in the present embodiment, the maximum region in which the display image 80 can be displayed in the AR glasses 10 is defined as the correction region 72. As shown in FIG. 5A, an area of the correction region 72 is greater than an area of the display region 70. As an example, in the AR glasses 10 of the present embodiment, the display region 70 is provided inside the correction region 72, and in the initial state, center positions of the display region 70 and the correction region 72 are the same.

Figure 5B:
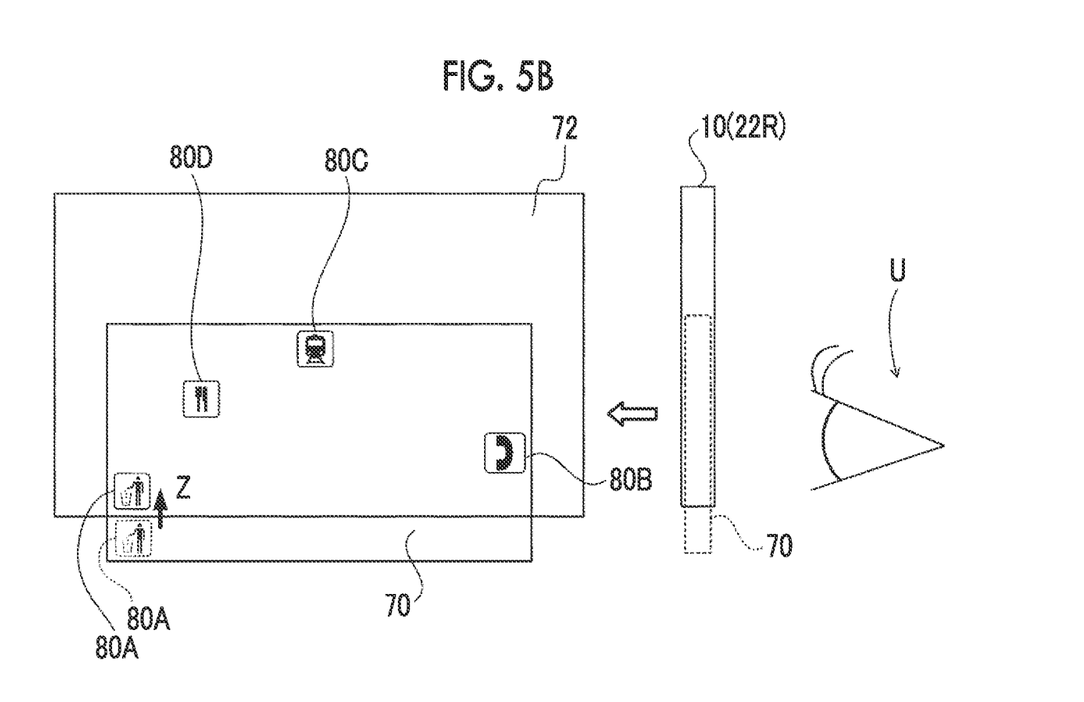
FIG. 5B is a diagram for explaining image stabilization by the processor according to the embodiment.

FIG. 5B shows a case in which at least one of the downward movement of the user's eye U or the upward movement of the AR glasses 10 occurs as the change of the relative position from the state shown in FIG. 5A. In this case, the display region position change unit 53A performs image stabilization that changes the position of the display region 70 with respect to the lens 22R for a right eye in a downward direction so as to cancel the change of the relative position. As shown in FIG. 5B, the relative position between the user's eye U and the display region 70 does not change from the initial state by changing the position of the display region 70 by the display region position change unit 53A. Since the display position of the display image 80 is also changed in response to the change of the position of the display region 70, the relative position between the user's eye U and the display position of the display image 80 does not change from the initial state. Therefore, the user can visually recognize the display image 80 as if it is not moving.

However, as shown in FIG. 5B, in a case in which the amount of blurring is large, the display region 70, whose position has been changed by the display region position change unit 53A, may exceed the correction region 72 to the outside. The display image 80 whose display position is within the display region 70 outside the correction region 72 is not actually displayed on the lens 22R for a right eye and is not visually recognized by the user's eye U. In the example shown in FIG. 5B, the display position of the display image 80A indicated by a dotted line is outside the correction region 72. Therefore, the display image 80A is not actually displayed on the lens 22R for a right eye and is not visually recognized by the user's eye U.

Therefore, the display image display position change unit 53B of the present embodiment changes the display position of the display image 80 whose display position is outside the correction region 72 to within the correction region 72. In the example shown in FIG. 5B, the display position of the display image 80A indicated by the dotted line is moved in a direction of an arrow Z, and the display position is changed to within the correction region 72 such that the entire display image 80A is within the correction region 72. In the example shown in FIG. 5B, the display image 80A after changing the display position to within the correction region 72 is indicated by a solid line. In this way, the user can visually recognize the display image 80A by changing the display position of the display image 80A to within the correction region 72.

In this way, the display region position change unit 53A performs basic image stabilization that changes the position of the display region 70 with respect to the lens 22R for a right eye based on the change of the relative position between the AR glasses 10 (lens 22R for a right eye) and the user's eye U. Specifically, the display region position change unit 53A of the present embodiment derives a display position (hereinafter, referred to as a basic correction display position) of the display image 80 according to a display position (hereinafter, referred to as an initial display position) of the display image 80 displayed in the display region 70 in the initial state and the change of the relative position. In a case in which the display position of the display image 80 derived by the display region position change unit 53A exceeds the correction region 72, the display image display position change unit 53B changes the display position of the display image 80 to a position within the correction region 72. The initial display position of the present embodiment is an example of a first position of the present disclosure. In addition, the basic correction display position of the display image 80 in a case in which the basic image stabilization is performed in the present embodiment is an example of a second position of the present disclosure. Further, the display position of the display image 80 derived by the display image display position change unit 53B of the present embodiment is an example of a third position of the present disclosure.

Figure 6A:
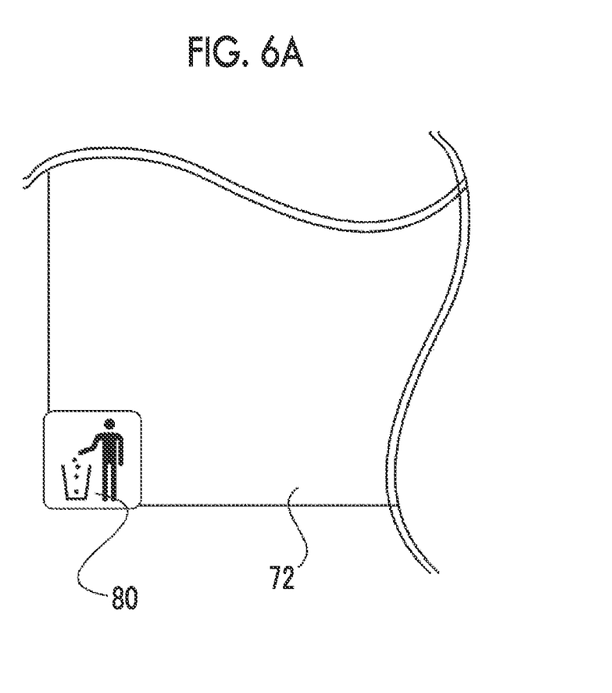
FIG. 6A is a diagram for explaining an example in a case in which a display position by basic image stabilization exceeds a correction region.
Figure 6B:
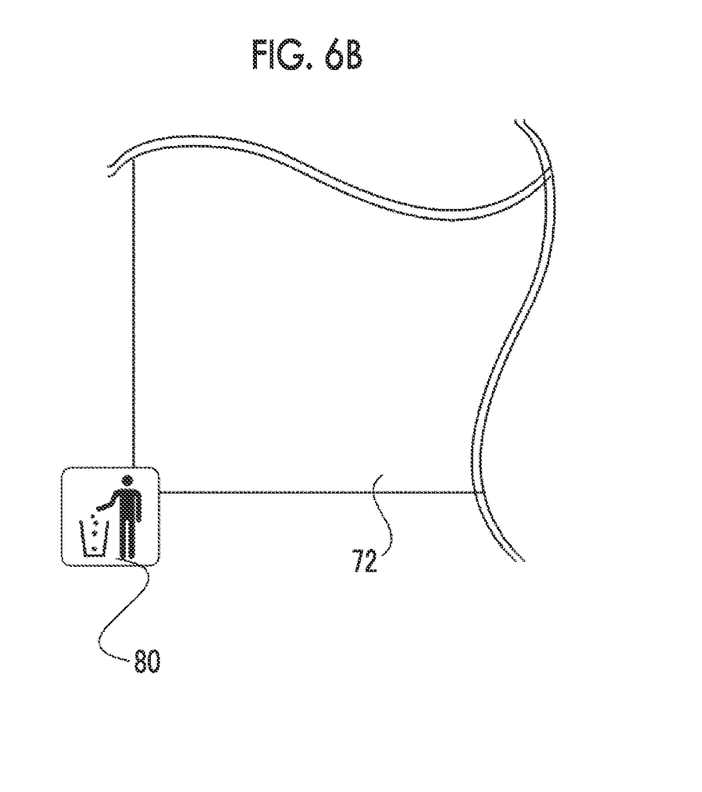
FIG. 6B is a diagram for explaining another example in a case in which the display position by the basic image stabilization exceeds the correction region.

The specific state in a case in which the display position of the display image 80 exceeds the correction region 72 is not particularly limited and may be predetermined. For example, as shown in FIG. 6A, in a case in which at least a part of the display image 80 is outside the correction region 72, in other words, there may be a case in which the display image 80 even slightly reaches outside the correction region 72. In addition, for example, as shown in FIG. 6B, there may be a case in which 90% or more of the area of the display image 80 is outside the correction region 72.

The image stabilization unit 52 outputs the display positions of the display images 80A to 80D derived by the display region position change unit 53A and the display image display position change unit 53B to the display controller 54.

The display controller 54 has a function of displaying the display images 80A to 80D at the display position input from the image stabilization unit 52. Specifically, the display controller 54 acquires image data of each of the display images 80A to 80D projected by the OLED 26. As an example, in the present embodiment, since the image data of each of the display images 80A to 80D is stored in the storage unit 44, the display controller 54 acquires the image data of each of the display images 80A to 80D from the storage unit 44. In addition, regardless of the present embodiment, an embodiment in which the image data of each of the display images 80A to 80D may be acquired from an external device of the smartphone 12 via the I/F unit 43 may be used. In the following, the image data of the display images 80A to 80D will be simply referred to as display images, and for example, acquiring the display image 80A is referred to as acquiring the display image.

Figure 7:
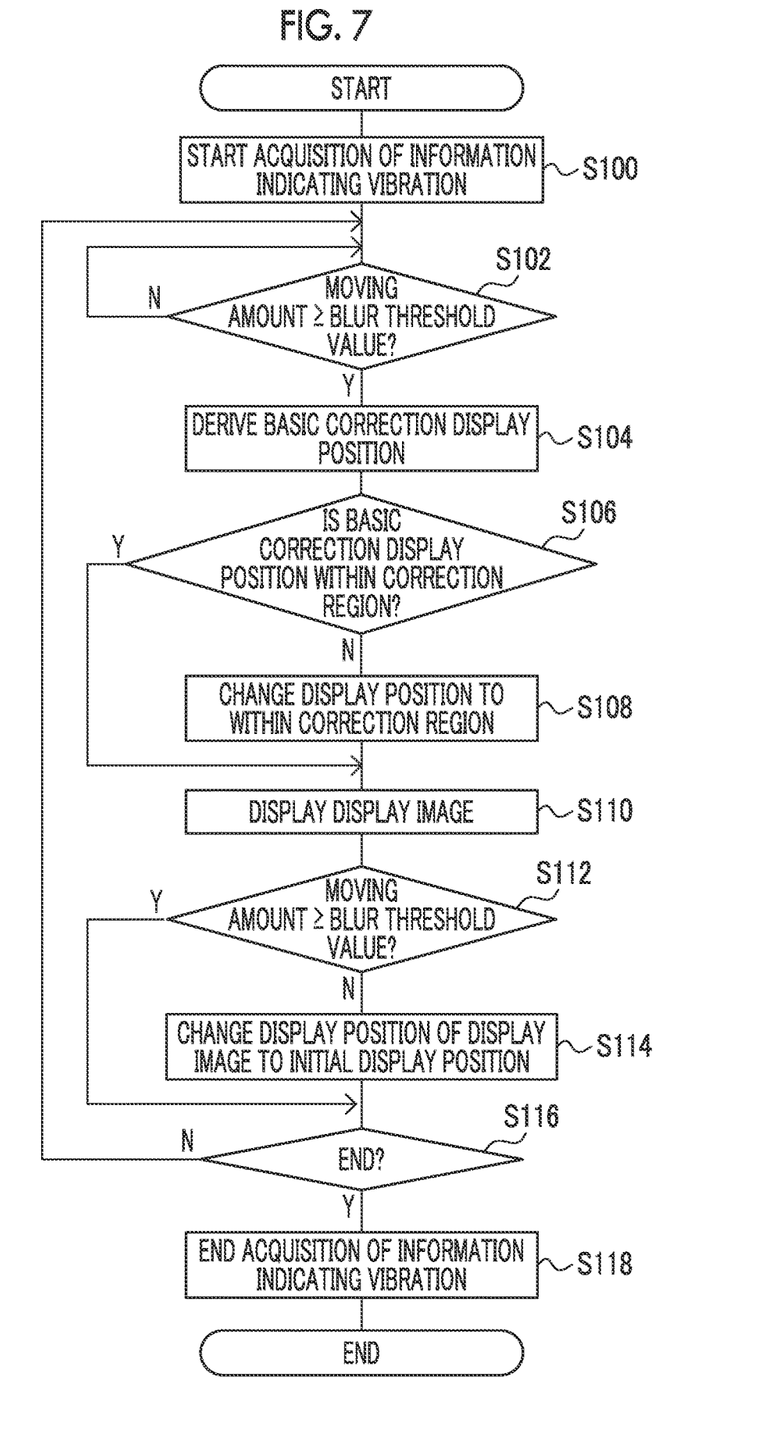
FIG. 7 is a flowchart showing an example of image processing executed by the processor according to the first embodiment.

Next, the action of the processor 41 of the present embodiment will be described. FIG. 7 shows a flowchart showing an example of the flow of image processing that is performed by the processor 41 of the smartphone 12 of the present embodiment. As an example, in the processor 41 of the present embodiment, in a case in which the projection of the projection image by the OLED 26 is started and the display of the display image 80 is started, the image processing shown as an example in FIG. 7 is executed.

In Step S100 of FIG. 7, the acquisition unit 50 starts acquisition of information indicating vibration as described above. Specifically, the acquisition of the information indicating the vibration output from the vibration detection sensor 29 is started.

In the next step S102, the display region position change unit 53A determines whether or not the moving amount of the AR glasses 10 is equal to or greater than a blur threshold value based on the information indicating the vibration acquired by the acquisition unit 50. As an example, in the present embodiment, in a case in which the moving amount is extremely small, the image stabilization is not performed, that is, the position of the display region 70 is not changed, and the position of the display image 80 is also not changed. Therefore, in the present embodiment, in a case in which the moving amount is equal to or greater than the blur threshold value, it is assumed that the moving amount is large, and the image stabilization is performed. The method of determining the blur threshold value, which is a criterion for whether or not to perform the image stabilization, is not particularly limited, and for example, may use an experimentally obtained value or may be adjustable by an individual user.

In a case in which the moving amount is less than the blur threshold value, the determination in Step S102 is a negative determination. On the other hand, in a case in which the moving amount is equal to or greater than the blur threshold value, the determination in Step S102 is an affirmative determination, and the processing proceeds to Step S104.

As described above, in Step S104, the display region position change unit 53A derives a basic correction display position of the display image 80 from the change of the relative position between the AR glasses 10 and the user's eye U and the initial display position in a case in which the basic image stabilization is performed. Specifically, the display region position change unit 53A derives the display position of the display image 80 according to the moving direction and the moving amount of the AR glasses 10 included in the information indicating the vibration acquired in Step S100. For example, in a case in which the moving amount is 5 mm and the moving direction is the downward direction, the display position, which is moved in the upward direction by 5 mm from the initial display position, is derived as the display position of the display image 80 as the basic correction display position. In a case in which a plurality of display images 80 are displayed in the display region 70, the basic correction display position is corrected for each of the plurality of display images 80.

In the next step S106, the display image display position change unit 53B determines whether or not the basic correction display position derived in Step S104 is within the correction region 72. In a case in which the basic correction display position is within the correction region 72, the determination in Step S106 is an affirmative determination, and the processing proceeds to Step S112. On the other hand, in a case in which the basic correction display position is outside the correction region 72, the determination in Step S106 is a negative determination, and the processing proceeds to Step S108.

In Step S108, the display image display position change unit 53B changes the display position outside the correction region 72 to the display position within the correction region 72, as described above. The change amount and change direction of the display position for changing the display position outside the correction region 72 to the display position within the correction region 72 by the display image display position change unit 53B are not particularly limited. For example, as an aspect in which the display image display position change unit 53B changes the display position of the display image 80 to within the correction region 72 may be used such that the change amount is minimized.

Figure 8:
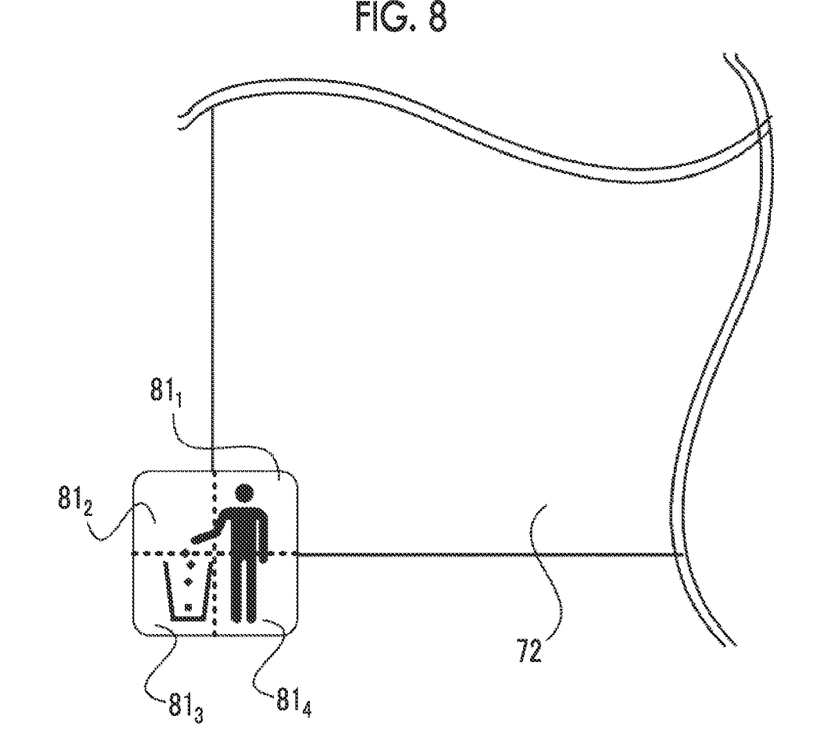
FIG. 8 is a diagram for explaining an example in which a display position of a display image is set within the correction region.

The display image display position change unit 53B is not limited to a degree to which the display image 80 is within the correction region 72 by changing the display position outside the correction region 72 to the display position within the correction region 72. For example, the display position may be changed such that the entire display image 80 is within the correction region 72, as in the display image 80A of FIG. 5B described above. In addition, for example, as shown in FIG. 8, partial regions $81_1$ to $81_4$ are determined for the display image 80, and the display position may be changed such that the predetermined partial region 81 (partial region $81_1$ in FIG. 8) is at least within the correction region 72. Which partial region 81 is to be at least within the correction region 72 may be determined by the content of the display image 80, the display position of the display image 80, or the like, and the method of determination is not particularly limited.

In addition, the display image display position change unit 53B gives, for example, a priority to the display image 80 according to the area within the correction region 72, and sets the display position of the display image 80 to the display position within the correction region 72 based on the priority given to the display image 80. For example, in a case in which the given priority is the highest, the display image display position change unit 53B may set the display position such that the entire area of the display image 80 is within the correction region 72, as shown in FIG. 5B described above, and may set the display position such that a part of the area of the display image 80 is allowed to be outside the correction region 72 as the priority becomes lower.

In a case in which the plurality of display images 80 are displayed in the display region 70, the determinations in Step S106 and Step S108 are performed independently for each display image 80. That is, the display image display position change unit 53B corrects the display positions of the plurality of display images 80 independently.

In the next step S110, the display controller 54 perform a control to display the display image 80. Specifically, for the display image 80 in which the display position derived in Step S104 is within the correction region 72, the display image 80 is displayed at the display position derived in Step S104. In addition, for the display image 80 in which the display position has been changed to within the correction region 72 in Step S108, the display controller 54 displays the display image 80 at the changed display position.

In the next step S112, the display region position change unit 53A determines whether or not the moving amount of the AR glasses 10 is equal to or greater than the blur threshold value based on the information indicating the vibration acquired by the acquisition unit 50, as in Step S102. That is, it is determined whether or not the vibration is continuing. In a case in which the moving amount is equal to or greater than the blur threshold value, that is, in a case in which the vibration is continuing, the determination in Step S112 is an affirmative determination, and the processing proceeds to Step S116.

On the other hand, in a case in which the moving amount is less than the blur threshold value, that is, in a case in which the vibration is stopped, the determination in Step S112 is a negative determination, and the processing proceeds to Step S114. In Step S114, the image stabilization unit 52 changes the display position of the display image 80 being displayed to the initial display position.

In the next step S116, the acquisition unit 50 determines whether or not to end the image processing shown in FIG. 7, that is, the image stabilization. As an example, in the present embodiment, while the display image 80 is being displayed, the determination in Step S116 is a negative determination, the processing returns to Step S102, and the processing of Steps S102 to S114 is repeated. On the other hand, in a case in which the display of the display image 80 ends, the determination in Step S116 is an affirmative determination, and the processing proceeds to Step S118.

In Step S118, the acquisition unit 50 ends the acquisition of the information indicating the vibration started in Step S100. In a case in which the processing of Step S118 ends, the image processing shown in FIG. 7 ends.

As described above, according to the processor 41 of the present embodiment, the display position of the display image 80 can be made appropriate in the image stabilization performed according to the change of the relative position between the AR glasses 10 and the user's eye U.

Second Embodiment

In the present embodiment, an aspect of changing the initial display position of the display image 80 to a position within a predetermined displayable range according to the change of the relative position between the AR glasses 10 and the user's eye U will be described. The displayable range is a region in which the basic correction display position according to the change of the relative position between the AR glasses 10 and the user's eye U is predicted not to exceed the correction region 72 for the display image 80 within the range.

For example, the change amount of the relative position between the AR glasses 10 and the user's eye U varies depending on the motion state of the user. Therefore, in the present embodiment, an aspect in which a displayable range according to the motion of the user is selected and the initial display position of the display image 80 is provided within the selected displayable range will be described.

Figure 9A:
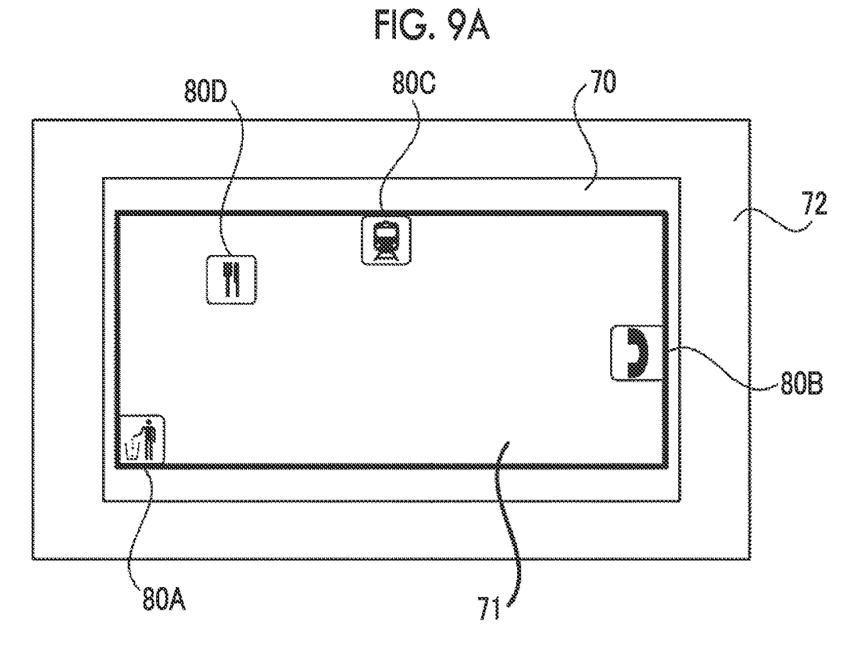
FIG. 9A is a diagram for explaining an example of a displayable range in a walking state.

For example, in a case in which the user is walking, the relative position between the AR glasses 10 and the user's eye U is likely to change in the up-down direction of the user. Therefore, as shown in FIG. 9A, in a case in which the user is walking, a range narrower in the up-down direction than the display region 70 is provided within the display region 70 as a displayable range 71.

Figure 9B:
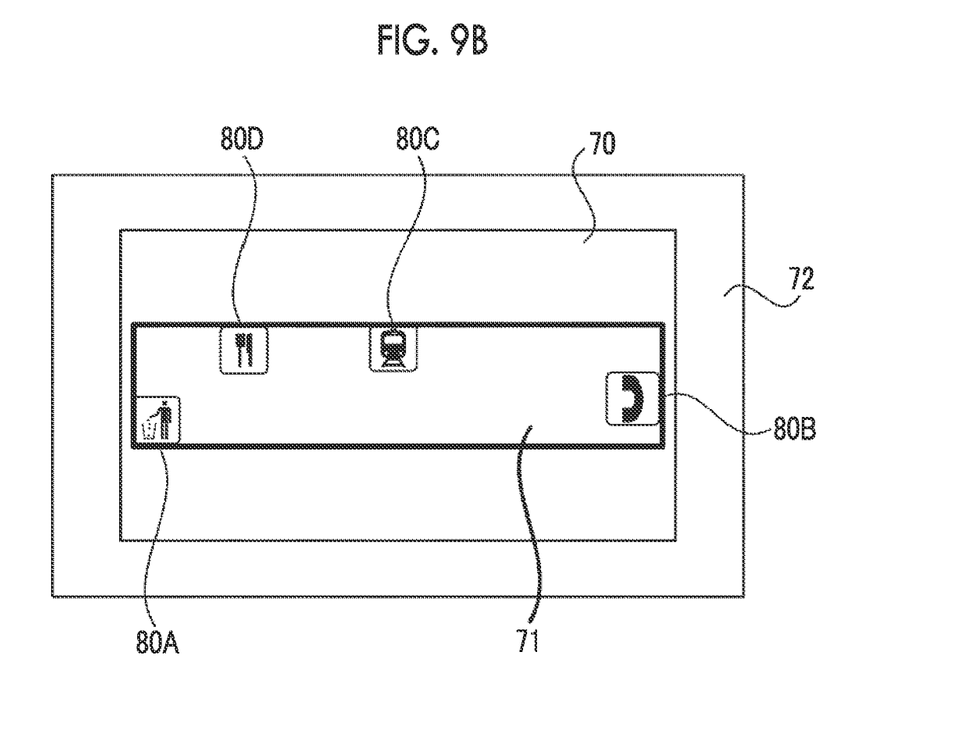
FIG. 9B is a diagram for explaining an example of a displayable range in a traveling state.

In addition, for example, in a case in which the user is traveling, the relative position between the AR glasses 10 and the user's eye U is likely to change in the up-down direction of the user, and the change amount thereof is greater than in a case in which the user is walking. Therefore, as shown in FIG. 9B, in a case in which the user is traveling, a range narrower even in the up-down direction than in a case in which the user is walking is provided within the display region 70 as the displayable range 71.

Figure 9C:
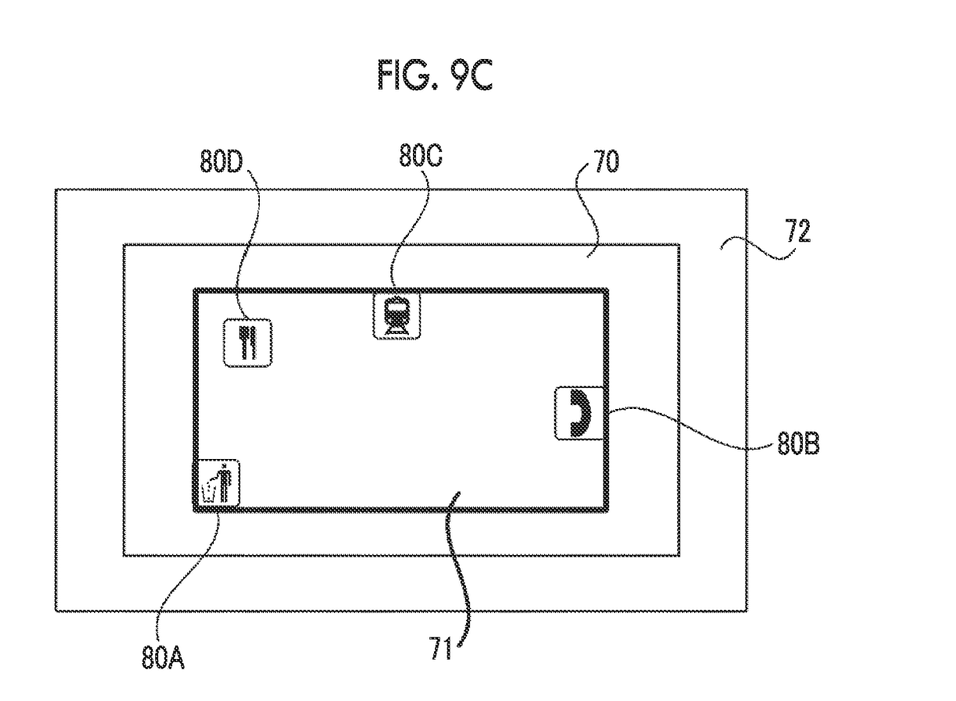
FIG. 9C is a diagram for explaining an example of a displayable range in a state of riding in a vehicle.

In addition, for example, in a case in which the user is riding in a vehicle such as an automobile or a train, the relative position of the AR glasses 10 and the user's eye U may change in the up-down and left-right directions of the user. Therefore, as shown in FIG. 9C, in a case in which the user is riding in the vehicle, a range narrower in the up-down direction and the left-right direction than the display region 70 is provided within the display region 70 as the displayable range 71.

In a case in which the user is stopped, such as the user is standing still or sitting, the relative position between the AR glasses 10 and the user's eye U does not change, and the display position of the display image 80 remains the initial display position. Therefore, the displayable range 71 is not particularly provided.

Unlike the first embodiment, in the present embodiment, the display region position change unit 53A of the image stabilization unit 52 predicts the motion state of the user based on the information indicating the vibration acquired by the acquisition unit 50, and changes the initial display position of the display image 80 to within the displayable range 71 according to the prediction result.

Figure 10:
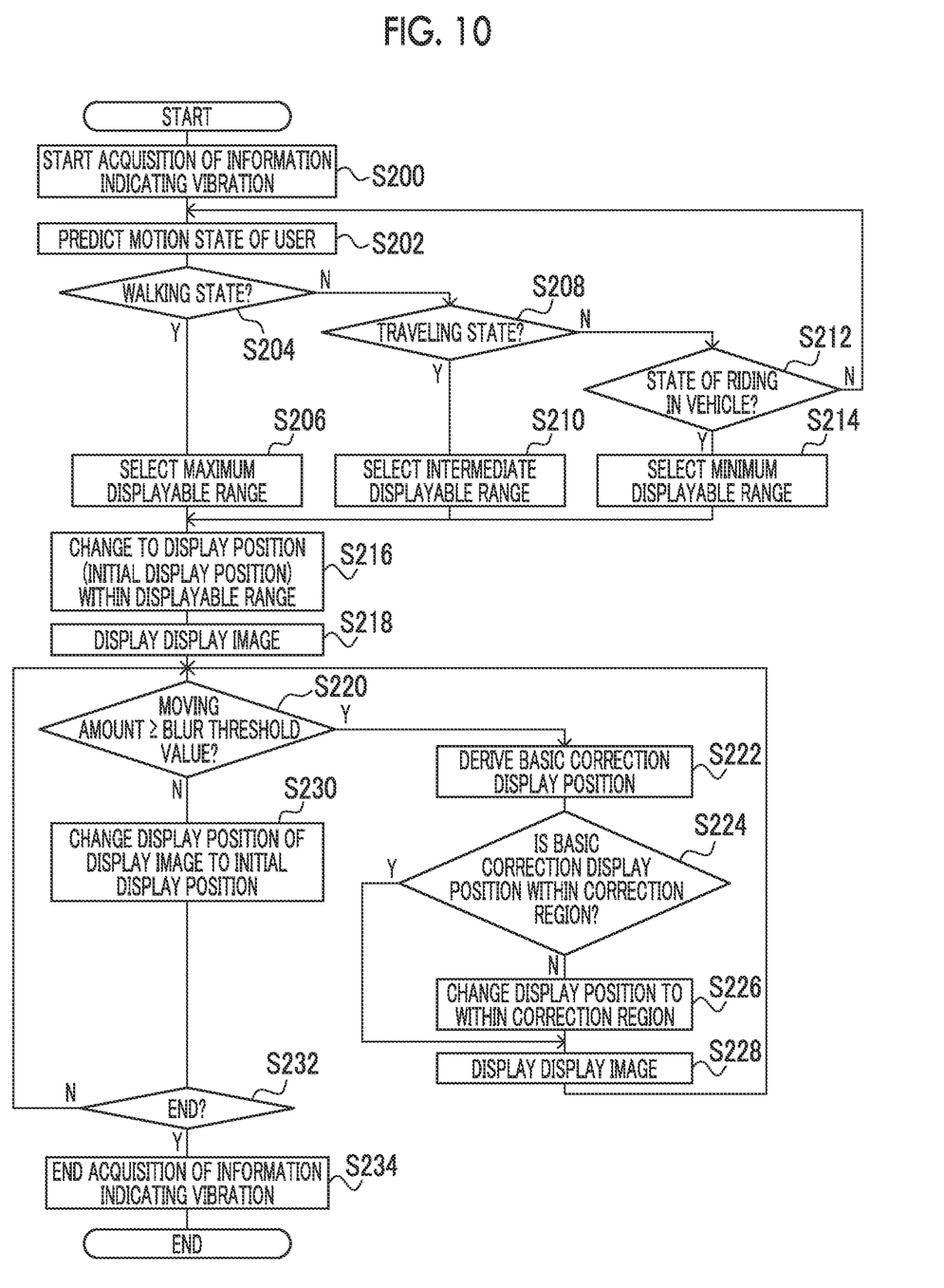
FIG. 10 is a flowchart showing an example of image processing executed by the processor according to the second embodiment.

FIG. 10 shows a flowchart showing an example of the flow of image processing that is performed by the processor 41 of the smartphone 12 of the present embodiment.

In Step S200 of FIG. 10, the acquisition unit 50 starts acquisition of information indicating vibration as described above. Specifically, the acquisition of the information indicating the vibration output from the vibration detection sensor 29 is started.

In the next step S202, as described above, the display region position change unit 53A predicts the motion state of the user. The method used by the display region position change unit 53A to predict the motion state of the user is not particularly limited. For example, an aspect in which a machine learning model that has been trained a correspondence relationship between the information indicating the vibration and the motion state of the user is used and the motion state of the user according to the information indicating the vibration acquired by the acquisition unit 50 is predicted may be used. In addition to the information indicating the vibration or other information may be used to predict the motion state of the user. For example, an aspect in which the moving speed of the user is detected, and based on the detection result, whether the motion state of the user is a stopped state, a walking state, a traveling state, or a state of riding in a vehicle is predicted may be used.

In the next step S204, it is determined whether or not the prediction result is the walking state. In the case of the walking state, the determination in Step S204 is an affirmative determination, and the processing proceeds to Step S206. In Step S206, the display region position change unit 53A selects the maximum displayable range 71, specifically, the displayable range 71 shown in FIG. 9A, as the displayable range 71. On the other hand, in a case in which it is not the walking state, Step S204 becomes a negative determination, and the processing proceeds to Step S208.

In Step S208, it is determined whether or not the prediction result is the traveling state. In a case in which it is the traveling state, the determination in Step S208 is an affirmative determination, and the processing proceeds to Step S210. In Step S210, the display region position change unit 53A selects an intermediate displayable range 71, specifically, the displayable range 71 shown in FIG. 9B, as the displayable range 71. On the other hand, in a case in which it is not the traveling state, Step S208 becomes a negative determination, and the processing proceeds to Step S212.

In Step S212, it is determined whether or not the prediction result is the state of riding in the vehicle. In a state in which it is the state of riding in the vehicle, the determination in Step S212 is an affirmative determination, and the processing proceeds to Step S214. In Step S214, the display region position change unit 53A selects the minimum displayable range 71, specifically, the displayable range 71 shown in FIG. 9C, as the displayable range 71. On the other hand, in a case in which it is not the state of riding in the vehicle, that is, it is the stop state, Step S212 becomes a negative determination, and the processing returns to Step S202.

In Step S216, the display region position change unit 53A changes the display position of the display image 80 to the displayable range 71. Specifically, the display position of the display image 80 is changed to within the displayable range 71 selected in any of Steps S206, S210, or S214, and the changed display position is set as the initial display position.

In the next step S218, the display controller 54 displays the display image 80 at the initial display position after the change in Step S216.

In the next step S220, in the same manner as in Step S112 of the image processing (refer to FIG. 7) of the first embodiment, the display region position change unit 53A determines whether or not the moving amount of the AR glasses 10 is equal to or greater than the blur threshold value based on the information indicating the vibration acquired by the acquisition unit 50. That is, it is determined whether or not the vibration is continuing. In a case in which the moving amount is equal to or greater than the blur threshold value, that is, in a case in which the vibration is continuing, the determination in Step S220 is an affirmative determination, and the processing proceeds to Step S222.

Since the processing of Steps S222 to S228 is the same as the processing of Steps S104 to S110 of the image processing (refer to FIG. 7) of the first embodiment, the description thereof will be omitted. In the present embodiment, after the end of Step S228, the processing returns to Step S220.

On the other hand, in a case in which the moving amount is less than the blur threshold value, that is, in a case in which the vibration is stopped, the determination in Step S220 is a negative determination, and the processing proceeds to Step S230. In Step S230, the image stabilization unit 52 changes the display position of the display image 80 being displayed to the initial display position. The initial display position here is the initial display position after the change in Step S216.

In the next step S232, the acquisition unit 50 determines whether or not to end the image processing shown in FIG. 10, that is, the image stabilization. As described above, while the display image 80 is being displayed, the determination in Step S232 is a negative determination, the processing returns to Step S220, and the processing of Steps S220 to S230 is repeated. On the other hand, in a case in which the display of the display image 80 ends, the determination in Step S232 is an affirmative determination, and the processing proceeds to Step S234.

In Step S234, the acquisition unit 50 ends the acquisition of the information indicating the vibration started in Step S200. In a case in which the processing of Step S234 ends, the image processing shown in FIG. 10 ends.

In this way, according to the processor 41 of the present embodiment, since the initial display position is within the displayable range 71 according to the change of the relative position between the AR glasses 10 and the user's eye U, the basic correction display position can be suppressed from exceeding the correction region 72. Therefore, a correction amount of the display position of the display image 80 can be reduced.

In each of the above-mentioned embodiments, in a case in which the display image 80 is superimposed on another display image 80 by changing the display position of the display image 80 to within the correction region 72 using the display image display position change unit 53B, the display position of the other display image 80 may be changed according to the display image 80 changed within the correction region 72.

In addition to the control of changing the display position of the other display image 80 as described above, the control may be performed such that the display images 80 are superimposed and displayed. In addition, a control of keeping the display position at the basic correction display position without changing the correction region 72 may be performed. In addition, an aspect in which the display image display position change unit 53B may selectively execute these three controls based on the user's instruction, the predetermined setting, or the like.

A shape of the glasses-type information display device is not limited to a general shape of glasses, an application, or a wearing portion. In addition, the glasses-type information display device may be a monocular type or a compound eye type, and the aspect in which the projected image is visually recognized with one eye has been described in the above-mentioned embodiment, but the projected image may be visually recognized with both eyes. A shape in which the left and right sides are connected like goggles may be used. In addition, it is not limited to devices worn on a human head, like a so-called head-mounted display (for example, if a robot with the appearance of a dog simulates a function of a human, and the function of human eyes is achieved by a camera in the robot's knee, then the control device according to the embodiment of the present disclosure is mounted on the knee). Such a control device is also included in the technique of the present disclosure.

In addition, the AR glasses 10 may comprise some or all of the functions of the processor 41 of the above-mentioned embodiment, or a device other than the glasses-type information display device 1 may comprise the functions.

In addition, the following various processors can be used in the above-mentioned embodiment as the hardware structures of processing units, which perform various types of processing, such as the acquisition unit 50, the image stabilization unit 52 (the display region position change unit 53A and the display image display position change unit 53B), and the display controller 54. The various processors include a programmable logic device (PLD) that is a processor of which the circuit configuration can be changed after manufacture, such as a field programmable gate array (FPGA), a dedicated electrical circuit that is a processor having circuit configuration dedicatedly designed to perform specific processing, such as an application specific integrated circuit (ASIC), and the like in addition to a CPU that is a general-purpose processor functioning as various processing units by executing software (program) as described above.

One processing unit may be formed of one of these various processors, or may be formed of a combination of two or more processors of the same type or different types (for example, a combination of a plurality of FPGAs or a combination of a CPU and an FPGA). In addition, a plurality of processing units may be formed of one processor.

As an example in which a plurality of processing units are formed of one processor, first, as in the above-mentioned embodiment, there is an aspect in which one processor is formed of a combination of one or more CPUs and software as typified by a computer, such as a client or a server, and functions as a plurality of processing units. Second, there is an aspect where a processor fulfilling the functions of the entire system, which includes a plurality of processing units, by one integrated circuit (IC) chip as typified by System On Chip (SoC) or the like is used. In this way, various processing units are formed using one or more of the above-mentioned various processors as hardware structures.

Furthermore, more specifically, electrical circuitry in which circuit elements, such as semiconductor elements, are combined can be used as the hardware structures of these various processors.

In addition, an aspect in which the image processing program 45 is stored (installed) in the storage unit 44 in advance has been described in each above-mentioned embodiment, but the present disclosure is not limited thereto. The image processing program 45 may be provided in a form where the image processing program 45 is recorded in recording mediums, such as a compact disc read only memory (CD-ROM), a digital versatile disc read only memory (DVD-ROM), and a universal serial bus (USB) memory. In addition, the image processing program 45 may be downloaded from an external device through a network.

In regard to the embodiment described above, the following supplementary notes will be further disclosed.

Supplementary Note 1

A processor configured to, based on a change of a relative position between a transmissive display device and a user's eye, derive a second position according to a first position of a display image displayed in a display region of the display device and the change of the relative position, change the first position to the second position in a case in which the second position does not exceed a correction region where a correction of a display position is possible, and change the first position to a third position and display the display image within the correction region in a case in which the second position exceeds the correction region.

Supplementary Note 2

The processor according to Supplementary Note 1, in which a position of the display region with respect to the correction region is changed according to the change of the relative position.

Supplementary Note 3

The processor according to Supplementary Note 1 or 2, in which in a case in which a plurality of the display images are displayed in the display region, the processor independently corrects display positions of the plurality of display images.

Supplementary Note 4

The processor according to any one of Supplementary Notes 1 to 3, in which in a case in which a first display image is superimposed on a second display image by changing a display position of the first display image to the third position, the processor performs a control to change a display position of the second display image according to the first display image after changing the display position to the third position.

Supplementary Note 5

The processor according to any one of Supplementary Notes 1 to 3, in which in a case in which a first display image is superimposed on a second display image by changing a display position of the first display image to the third position, the processor selectively performs any of a first control to change a display position of the second display image according to the first display image after changing the display position to the third position, a second control to superimpose and display the first display image and the second display image, or a third control to set the display position of the first display image to the second position.

Supplementary Note 6

The processor according to any one of Supplementary Notes 1 to 5, in which a displayable range in which the display of the display image is possible is predetermined according to a degree of the change of the relative position, and the processor changes the display position of the display image to within the displayable range.

Supplementary Note 7

The processor according to Supplementary Note 6, in which the processor selects the displayable range according to a motion state of the user, and changes the display position of the display image to within the selected displayable range.

Supplementary Note 8

The processor according to any one of Supplementary Notes 1 to 7, in which in a case in which a change amount of the relative position exceeds a predetermined threshold value, the processor performs a control to hide the display image instead of changing the first position to the third position.

Supplementary Note 9

The processor according to any one of Supplementary Notes 1 to 8, in which the display image is divided into a plurality of partial regions, and the third position is a position where at least a predetermined partial region among the plurality of partial regions is within the correction region.

Supplementary Note 10

The processor according to any one of Supplementary Notes 1 to 8, in which a priority according to an area within the correction region is given to the display image, and in a case in which the second position exceeds the correction region, the processor changes the second position to the third position based on the priority.

Supplementary Note 11

The processor according to any one of Supplementary Notes 1 to 10, in which a case in which the second position exceeds the correction region where the correction of the display position is possible is a case in which at least a part of the display image is outside the correction region.

Supplementary Note 12

The processor according to any one of Supplementary Notes 1 to 10, in which a case in which the second position exceeds the correction region where the correction of the display position is possible is a case in which 90% or more of an area of the display image is outside the correction region.

Supplementary Note 13

An image processing device comprising a processor configured to, based on a change of a relative position between a transmissive display device and a user's eye, derive a second position according to a first position of a display image displayed in a display region of the display device and the change of the relative position, change the first position to the second position in a case in which the second position does not exceed a correction region where a correction of a display position is possible, and change the first position to a third position and display the display image within the correction region in a case in which the second position exceeds the correction region.

Supplementary Note 14

A glasses-type information display device comprising a transmissive display device, and the processor according to any one of Supplementary Notes 1 to 12.

Supplementary Note 15

An image processing method executed by a processor, comprising, based on a change of a relative position between a transmissive display device and a user's eye, deriving a second position according to a first position of a display image displayed in a display region of the display device and the change of the relative position, changing the first position to the second position in a case in which the second position does not exceed a correction region where a correction of a display position is possible, and changing the first position to a third position and displaying the display image within the correction region in a case in which the second position exceeds the correction region.

Supplementary Note 16

An image processing program for causing a processor to execute a process comprising, based on a change of a relative position between a transmissive display device and a user's eye, deriving a second position according to a first position of a display image displayed in a display region of the display device and the change of the relative position, changing the first position to the second position in a case in which the second position does not exceed a correction region where a correction of a display position is possible, and changing the first position to a third position and displaying the display image within the correction region in a case in which the second position exceeds the correction region.

What is claimed is:

1. A processor configured to:
based on a change of a relative position between a transmissive display device and a user's eye,
derive a second position according to a first position of a display image displayed in a display region of the display device and the change of the relative position;
change the first position to the second position in a case in which the second position does not exceed a correction region where a correction of a display position is possible; and
change the first position to a third position and display the display image within the correction region in a case in which the second position exceeds the correction region,
wherein the processor is configured to change a position of the display region with respect to the correction region according to the change of the relative position, and
wherein the processor is configured to independently correct display positions of the plurality of display images, in a case in which a plurality of the display images are displayed in the display region.

2. The processor according to claim 1,
wherein the processor is configured to perform a control to change a display position of the second display image according to the first display image after changing the display position to the third position, in a case in which a first display image is superimposed on a second display image by changing a display position of the first display image to the third position.

3. The processor according to claim 1,
wherein the processor is configured to selectively perform any of a first control to change a display position of the second display image according to the first display image after changing the display position to the third position, a second control to superimpose and display the first display image and the second display image, or a third control to set the display position of the first display image to the second position, in a case in which a first display image is superimposed on a second display image by changing a display position of the first display image to the third position.

4. The processor according to claim 1,
wherein a displayable range in which the display of the display image is possible is predetermined according to a degree of the change of the relative position, and
the processor is configured to change the display position of the display image to within the displayable range.

5. The processor according to claim 4,
wherein the processor is configured to:
select the displayable range according to a motion state of the user, and
change the display position of the display image to within the selected displayable range.

6. The processor according to claim 1,
wherein the processor is configured to perform a control to hide the display image instead of changing the first position to the third position, in a case in which a change amount of the relative position exceeds a predetermined threshold value.

7. A processor configured to:
based on a change of a relative position between a transmissive display device and a user's eye,
derive a second position according to a first position of a display image displayed in a display region of the display device and the change of the relative position;
change the first position to the second position in a case in which the second position does not exceed a correction region where a correction of a display position is possible; and
change the first position to a third position and display the display image within the correction region in a case in which the second position exceeds the correction region,
wherein the display image is divided into a plurality of partial regions, and
the third position is a position where at least a predetermined partial region among the plurality of partial regions is within the correction region.

8. A processor configured to:
based on a change of a relative position between a transmissive display device and a user's eye,
derive a second position according to a first position of a display image displayed in a display region of the display device and the change of the relative position;
change the first position to the second position in a case in which the second position does not exceed a correction region where a correction of a display position is possible; and
change the first position to a third position and display the display image within the correction region in a case in which the second position exceeds the correction region,
wherein a priority according to an area within the correction region is given to the display image, and
the processor is configured to change the second position to the third position based on the priority, in a case in which the second position exceeds the correction region.

9. A processor configured to:
based on a change of a relative position between a transmissive display device and a user's eye, derive a second position according to a first position of a display image displayed in a display region of the display device and the change of the relative position;

change the first position to the second position in a case in which the second position does not exceed a correction region where a correction of a display position is possible; and change the first position to a third position and display the display image within the correction region in a case in which the second position exceeds the correction region, wherein a case in which the second position exceeds the correction region where the correction of the display position is possible is a case in which at least a part of the display image is outside the correction region.

* * * * *